US011292579B2

United States Patent
Barmichev et al.

(10) Patent No.: US 11,292,579 B2
(45) Date of Patent: Apr. 5, 2022

(54) ARTICULATED EMPENNAGE WITH RUDDER AND ELEVATOR

(71) Applicant: The Boeing Company, Chicago, IL (US)

(72) Inventors: Sergey Barmichev, Kirkland, WA (US); Mithra Sankrithi, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 724 days.

(21) Appl. No.: 16/141,943

(22) Filed: Sep. 25, 2018

(65) Prior Publication Data
US 2020/0094939 A1 Mar. 26, 2020

(51) Int. Cl.
*B64C 5/02* (2006.01)
*B64C 9/06* (2006.01)
*B64C 5/16* (2006.01)
*B64C 7/00* (2006.01)

(52) U.S. Cl.
CPC .............. *B64C 5/02* (2013.01); *B64C 5/16* (2013.01); *B64C 7/00* (2013.01); *B64C 9/06* (2013.01)

(58) Field of Classification Search
CPC .... B64C 5/02; B64C 5/06; B64C 9/04; B64C 9/06; B64C 5/14; B64C 5/18
See application file for complete search history.

(56) References Cited

U.S. PATENT DOCUMENTS

| 1,588,141 | A |   | 6/1926  | Rohrbach |
|-----------|---|---|---------|----------|
| 1,900,631 | A | * | 3/1933  | Bellanca ............... B64D 27/023 244/37 |
| 2,580,176 | A | * | 12/1951 | Johnson .................... B64C 5/14 244/87 |
| 2,670,910 | A |   | 3/1954  | Hill et al. |
| 2,702,168 | A | * | 2/1955  | Platt ..................... B64C 29/0033 244/7 R |
| 2,989,269 | A |   | 6/1961  | Le Bel |
| 3,146,970 | A |   | 9/1964  | Girard |
| 3,807,665 | A |   | 4/1974  | Coombe |
| 3,915,411 | A | * | 10/1975 | Surbaugh ................ B64C 29/00 244/12.2 |
| 4,261,533 | A |   | 4/1981  | Roberts et al. |
| 6,273,363 | B1 |  | 8/2001  | Sprenger |
| 8,014,910 | B2 |  | 9/2011  | Mathieu et al. |

(Continued)

OTHER PUBLICATIONS

Wikipedia, "Handley Page Victor", URL: https://en.wikipedia.org/wiki/Handley_Page_Victor, First Flight 1952, circa before Sep. 25, 2018, 21 pages.

(Continued)

*Primary Examiner* — Timothy D Collins
*Assistant Examiner* — Terri L Filosi
(74) *Attorney, Agent, or Firm* — Kolisch Hartwell, P.C.

(57) ABSTRACT

An aircraft empennage includes a lower vertical fin member attached to a rear portion of a fuselage, and an upper stabilizer assembly connected to the lower vertical member by an articulating mount configured to allow movement of the upper stabilizer assembly relative to the lower vertical member to adjust pitch trim of the fuselage. The upper stabilizer assembly includes first and second horizontal stabilizer portions and at least one upper vertical member.

21 Claims, 7 Drawing Sheets

(56) References Cited

U.S. PATENT DOCUMENTS

| | | | |
|---|---|---|---|
| 8,342,446 B2* | 1/2013 | Chareyre | B64C 5/18 |
| | | | 244/87 |
| 2003/0094537 A1 | 5/2003 | Austen-Brown | |
| 2007/0102575 A1 | 5/2007 | Morgan et al. | |
| 2009/0108130 A1* | 4/2009 | Flatt | H02K 7/108 |
| | | | 244/99.9 |
| 2010/0133377 A1* | 6/2010 | Cazals | B64C 1/0009 |
| | | | 244/55 |
| 2016/0176505 A1 | 6/2016 | Chandrasekharan et al. | |
| 2017/0129592 A1 | 5/2017 | Clemen, Jr. et al. | |
| 2019/0375491 A1* | 12/2019 | Wilson | B64C 5/06 |
| 2020/0148329 A1 | 5/2020 | White | |

OTHER PUBLICATIONS

Wikipedia, "Lockheed JetStar", URL: https://en.wikipedia.org/wiki/Lockheed_JetStar, First Flight 1957, circa before Sep. 25, 2018, 9 pages.

U.S. Patent and Trademark Office, Non-Final Office Action regarding U.S. Appl. No. 16/141,920, dated Aug. 6, 2020, 15 pages.

* cited by examiner

ARTICULATED EMPENNAGE WITH RUDDER AND ELEVATOR

FIELD

This disclosure relates to aircraft empennage structures. More specifically, the disclosed embodiments relate to systems and methods associated with empennages having one or more rudders and one or more elevators.

INTRODUCTION

An aircraft empennage typically includes one or more fixed and/or movable surfaces disposed at a tail end of the aircraft fuselage and configured to direct and/or stabilize the aircraft. Empennage design is subject to several constraints. It is desirable that the empennage be as light as possible and have as little drag as possible, while still being capable of providing sufficient pitch and yaw stability as well as pitch and yaw control for aircraft operation. Additionally, it is preferable that the empennage and associated structures occupy as little of the aircraft fuselage as possible, in order to maximize the amount of fuselage space available for payload such as passengers and cargo. An empennage that meets these demands better than known empennages would allow for improved aircraft capacity, fuel efficiency, and operating economics.

SUMMARY

The present disclosure provides systems, apparatuses, and methods relating to aircraft empennages. In some embodiments, an aircraft comprises a fuselage capable of carrying payload, the fuselage having a rear portion; and an empennage connected to the rear portion of the fuselage, the empennage including a lower vertical fin member, and an upper stabilizer assembly connected to the lower vertical fin member by an articulating mount configured to allow movement of the entire upper stabilizer assembly relative to the lower vertical fin member to generate a pitch trim moment acting on the aircraft in a flight mode, wherein the lower vertical fin member has a lower trailing rudder structure, the upper stabilizer assembly having first and second horizontal stabilizer portions and at least a first upper vertical member, the upper vertical member having a first upper trailing rudder structure, each of the rudder structures being configured for generating a yaw control moment acting on the aircraft.

In some embodiments, an aircraft comprises a fuselage capable of carrying payload, the fuselage having a rear portion; a fin assembly including a lower fin portion connected to a first upper fin portion through an articulating mount; and a first horizontal stabilizer portion connected to a second horizontal stabilizer portion through the articulating mount, wherein the articulating mount permits trim control movement of the first upper fin portion together with the first and second horizontal stabilizer portions relative to the lower fin portion.

In some embodiments, a method of trimming pitch of an aircraft comprises providing an empennage connected to a rear portion of a fuselage, the empennage including a lower vertical fin member, and an upper stabilizer assembly connected to the lower vertical fin member by an articulating mount configured to allow movement of the entire upper stabilizer assembly relative to the lower vertical fin member to generate a pitch trim moment acting on the aircraft in a flight mode, the lower vertical fin member having a lower trailing rudder structure configured for generating a yaw control moment acting on the aircraft, the upper stabilizer assembly including at least a first horizontal portion and a first vertical portion, the first horizontal portion having a first trailing elevator configured for generating a pitch control moment acting on the aircraft, and the first vertical portion having an upper trailing rudder structure configured for generating a yaw control moment acting on the aircraft; and rotating the upper stabilizer assembly around an axis perpendicular to a plane of symmetry of the aircraft.

Features, functions, and advantages may be achieved independently in various embodiments of the present disclosure, or may be combined in yet other embodiments, further details of which can be seen with reference to the following description and drawings.

DETAILED DESCRIPTION

Figure 1:
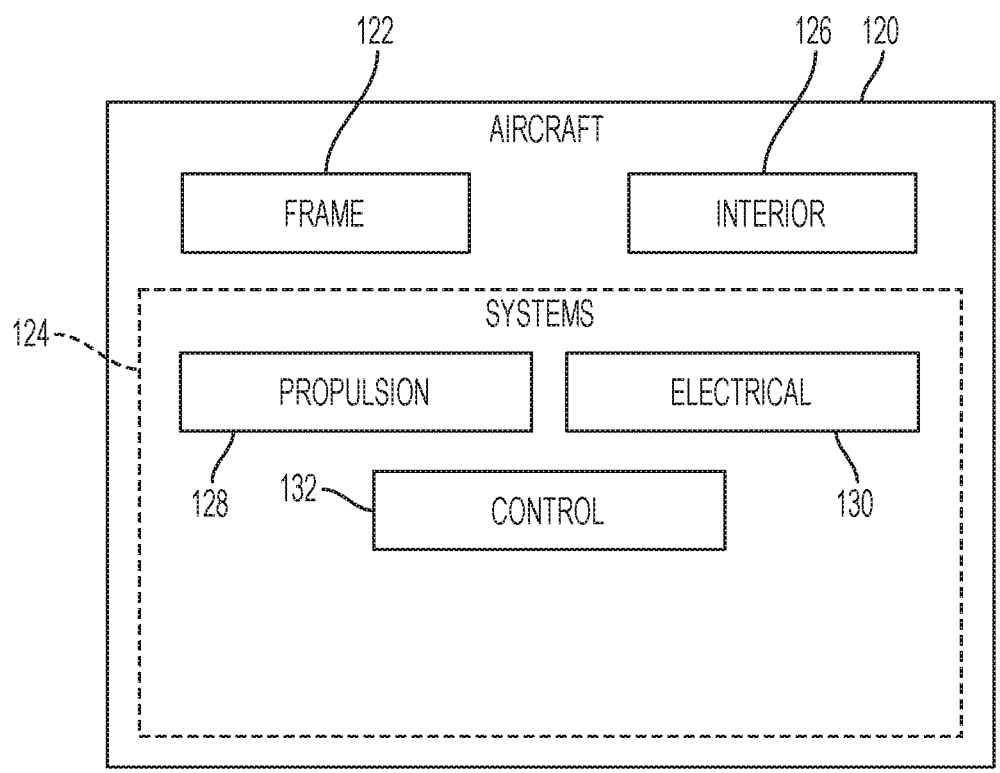
FIG. 1 is a schematic diagram of an illustrative aircraft in accordance with aspects of the present disclosure.

Various aspects and examples of an empennage having a rudder and an elevator, as well as related methods, are described below and illustrated in the associated drawings. Unless otherwise specified, an empennage in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Illustrative Combinations and Additional Examples; (5) Advantages, Features, and Benefits; and (6) Conclusion. The Examples, Components, and Alternatives section is further divided into subsections A through F, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," and "aft" (and the like) are intended to be understood in the context of a host vehicle on which systems described herein may be mounted or otherwise attached. For example, "outboard" may indicate a relative position that is laterally farther from the centerline of the vehicle, or a direction that is away from the vehicle centerline. Conversely, "inboard" may indicate a direction toward the centerline, or a relative position that is closer to the centerline. Similarly, "forward" means toward the front portion of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the crossbar would be installed with the edge in question facing in the direction of the front portion of the host vehicle.

"Coupled" means connected, either permanently or releasably, whether directly or indirectly through intervening components.

Overview

In general, an empennage in accordance with aspects of the present teachings includes a lower vertical fin member connected to a rear portion of an aircraft fuselage, and an upper stabilizer assembly connected to the lower vertical member by an articulating mount. The articulating mount is configured to allow movement of the entire upper stabilizer assembly relative to the lower vertical fin member. The empennage, which may also be referred to as a tail or tail assembly, typically includes at least one device (e.g. a control surface) configured for generating at least one moment acting on the aircraft. Accordingly, the empennage is typically configured for contributing to longitudinal and directional stability of the aircraft. The aircraft typically includes a controller enabling adjustment of the control devices.

A moment generated by an empennage device may be characterized as a stabilizing moment, a control moment (e.g., a moment configured to control a direction of movement of an aircraft), or a trim moment (e.g., a moment configured to maintain a set aircraft direction). In some cases, an empennage device may be capable of generating a control moment or a trim moment, as needed. Generating a trim moment acting on the aircraft may also be referred to as trimming the aircraft, and/or as adjusting trim.

Generated moments may be further characterized as having components (e.g., torque components) about a yaw axis, pitch axis, and/or roll axis of the aircraft. A yaw moment is a moment configured to rotate the aircraft about the yaw axis, a pitch moment is a moment configured to rotate the aircraft about the pitch axis, and a roll moment is a moment configured to rotate the aircraft about the roll axis. A single empennage device may be configured to generate a moment having components about a single axis, about two axes, or about three axes.

An empennage according to the present teachings typically has devices configured for generating yaw moments and/or pitch moments. As one example, the lower vertical fin member of the empennage, which may also be referred to as a lower fin or a lower vertical stabilizer, typically has a rudder disposed at a trailing edge (e.g., an aft edge). The rudder position (e.g., an angular position with respect to the trailing edge of the fin) may be selected such that the rudder generates a desired yaw moment acting on the aircraft.

As another example, the upper stabilizer assembly of the empennage is typically configured such that rotation of the upper stabilizer assembly relative to the lower vertical member generates a pitch trim moment. For example, the articulating mount may be configured to allow rotation of the upper stabilizer assembly about an axis substantially perpendicular to a plane of symmetry of the fuselage. Accordingly, the upper stabilizer assembly may be moved relative to the lower vertical member to adjust pitch trim of the aircraft.

As yet another example, the upper stabilizer assembly of the empennage typically comprises a pair of horizontal stabilizer portions, and each horizontal stabilizer portion typically includes an adjustable trailing-edge control surface configured for generating a pitch control moment acting on the aircraft. The adjustable trailing-edge control surfaces may be referred to as elevators. In addition to elevators, the upper stabilizer assembly may include at least one upper vertical member having an upper trailing rudder structure configured for generating a yaw control moment acting on the aircraft.

EXAMPLES, COMPONENTS, AND ALTERNATIVES

The following sections describe selected aspects of exemplary empennages as well as related systems and/or methods. The examples in these sections are intended for illustration and should not be interpreted as limiting the entire scope of the present disclosure. Each section may include one or more distinct embodiments or examples, and/or contextual or related information, function, and/or structure.

A. Illustrative Aircraft

FIG. 1 schematically depicts an illustrative aircraft 120 in accordance with the present teachings. Aircraft 120 may include a frame 122 (also referred to as an airframe) with a plurality of systems 124 and an interior 126. External surfaces of aircraft frame 122 are typically carefully contoured for desirable aerodynamic attributes related to, e.g., drag minimization, lift maximization, stability, control, and/or any other suitable property. Examples of plurality of systems 124 include one or more of a propulsion system 128, an electrical system 130, and a control system 132. Each system may comprise various subsystems, such as controllers, processors, actuators, effectors, motors, generators, etc., depending on the functionality involved. Any number of other systems may be included.

Figure 2:
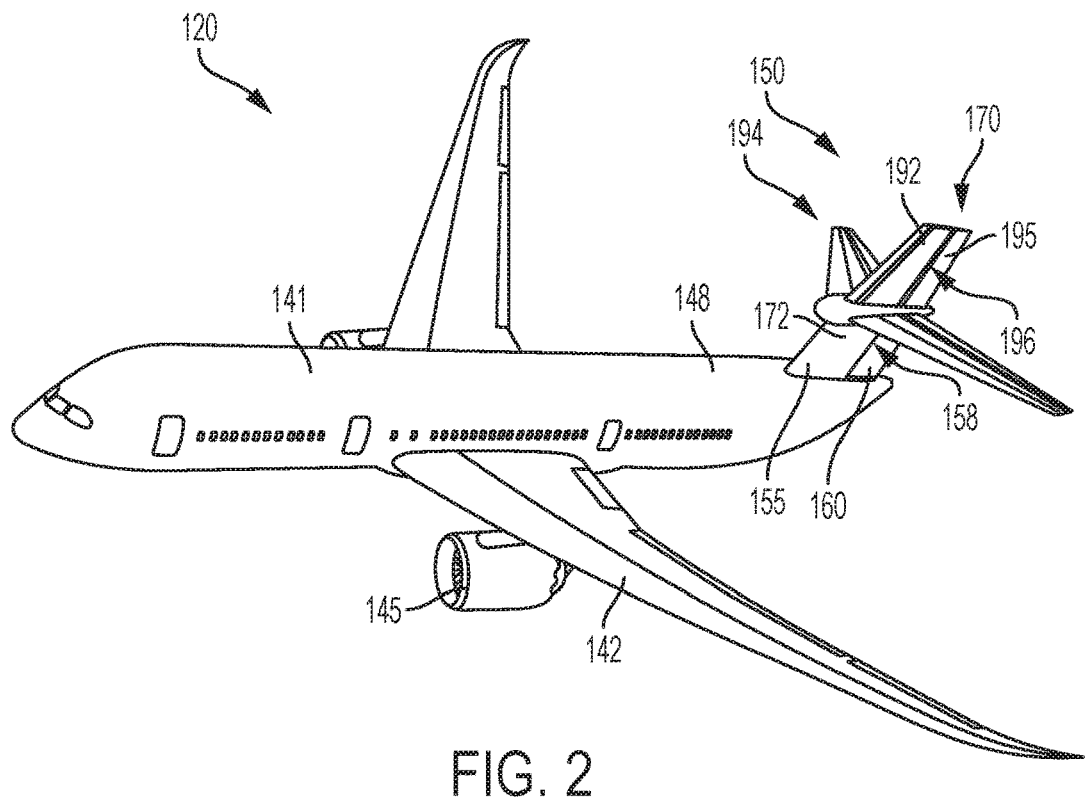
FIG. 2 is an isometric view of the aircraft of FIG. 1.

FIG. 2 is an isometric view of illustrative aircraft 120. As shown in FIG. 2, aircraft 120 includes a fuselage 141 capable of carrying payload (such as passengers, baggage, and/or revenue cargo), and at least one wing 142 attached to the fuselage and capable of generating aerodynamic lift acting on the aircraft. Fuselage 141 and wing 142 are example components of aircraft frame 122. Aircraft 120 further includes at least one propulsor 145. Propulsor 145 is an example component of propulsion system 128, and may comprise, e.g., one or more engines, gas turbines, turbofans, geared turbofans, fans, propellers, open rotors, augmentor fans, and/or any other devices capable of generating thrust acting on the aircraft. Propulsor 145 is typically attached to wing 142, fuselage 141, and/or to any other suitable portion of aircraft frame 122.

Fuselage 141 has a rear portion 148, which may also be referred to as an aft portion or tail portion. An empennage may be connected to rear fuselage portion 148. Illustrative example empennages are described in the next sections.

B. Illustrative Cruciform Empennage

This section describes an illustrative cruciform empennage 150, in accordance with aspects of the present teachings. Cruciform empennage 150, which is illustrated in FIGS. 2-7, is an example of an empennage having an articulated upper stabilizer assembly, as described above.

Figure 3:
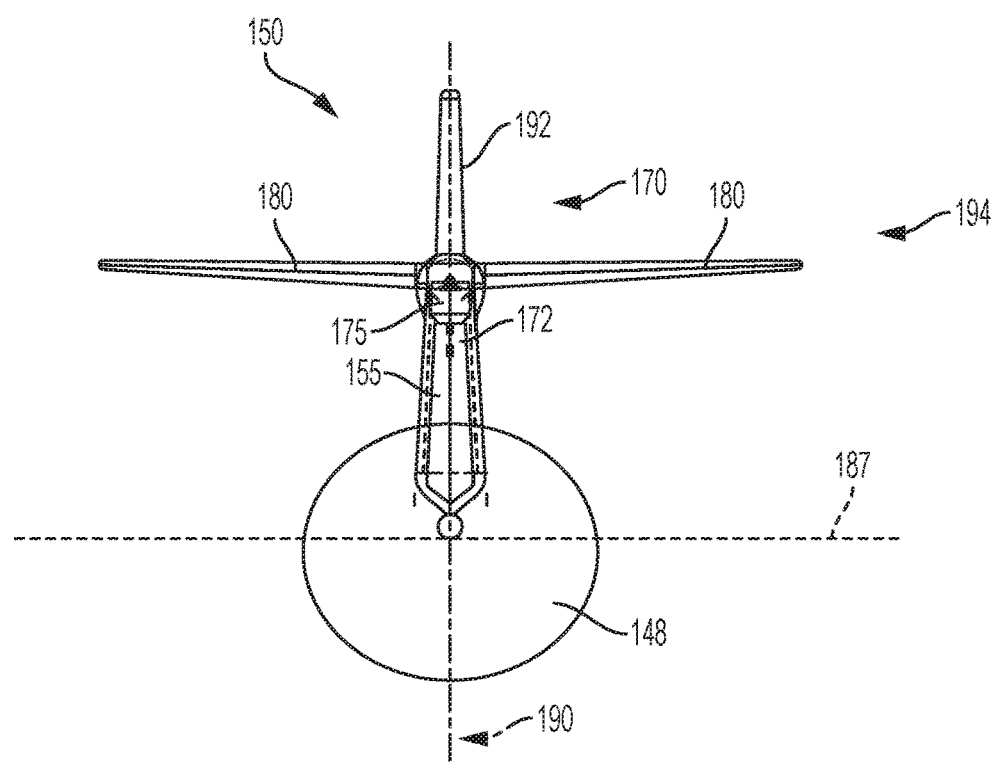
FIG. 3 is a front view of an illustrative cruciform empennage in accordance with aspects of the present disclosure.

Cruciform empennage 150 is depicted in an isometric view in FIG. 2, and in a front view in FIG. 3. As shown in these figures, cruciform empennage 150 includes a lower vertical fin member 155 rigidly attached to rear fuselage portion 148. Lower vertical fin member 155 may have any size and shape suitable for providing directional stability to aircraft 120. Typically, as in the examples shown in FIGS. 2-3, lower vertical fin member 155 extends upwardly from rear fuselage portion 148. Lower vertical fin member 155 may be sized and shaped such that the lower vertical fin member produces as little aerodynamic drag as possible.

Lower vertical fin member 155 has a trailing edge 158. A lower rudder 160 (also referred to as a lower trailing rudder) is movably attached to trailing edge 158 and configured to generate a yaw moment acting on aircraft 120. Typically, lower rudder 160 is capable of generating a yaw control moment or a yaw trim moment, as needed. A position of lower rudder 160 relative to lower vertical fin member 155 may be controlled (e.g., by aircraft control system 132) to generate a desired moment. Lower rudder 160 may be attached to trailing edge 158 in any suitable manner. For example, the attachment may be hinged, such that lower rudder 160 is configured to pivot about an axis located at and/or adjacent trailing edge 158. Additionally, or alternatively, lower rudder 160 may be configured for translational movement relative to lower vertical fin member 155. Lower rudder 160 may comprise a single-hinged rudder, a double-hinged rudder, a triple-hinged rudder, a tabbed rudder, a slotted rudder, a blown rudder, a rudder comprising multiple adjacent panels, a rudder comprising full or partial double-hinged rudder members, and/or any other suitable rudder. In some cases, more than one rudder is attached to trailing edge 158.

Cruciform empennage 150 further includes an upper stabilizer assembly 170 mounted to a distal portion 172 of lower vertical fin member 155 (e.g., to a portion of the lower vertical fin member that is distal fuselage 141). Upper stabilizer assembly 170 is connected to lower vertical fin member 155 through an articulating mount 175. Articulating mount 175 is configured to allow movement of upper stabilizer assembly 170 relative to lower vertical fin member 155, thereby adjusting a pitch trim of aircraft 120. Movement of articulating mount 175 is discussed further below with reference to FIGS. 5-6.

Upper stabilizer assembly 170 includes a pair of horizontal stabilizer portions 180. Horizontal stabilizer portions 180 typically extend from articulating mount 175 in substantially opposing directions. Horizontal stabilizer portions 180 are typically oriented substantially parallel to a horizontal axis 187 of aircraft 120. Horizontal axis 187 extends parallel to the pitch axis and perpendicular to a plane of symmetry 190 of fuselage 141. Plane of symmetry 190 is depicted as an edge view in FIG. 3. In some examples, one or both horizontal stabilizer portions 180 may form a dihedral angle and/or an anhedral angle with horizontal axis 187.

Upper stabilizer assembly 170 further includes an upper vertical member 192. Upper vertical member 192, which may also be referred to as an upper fin member, extends upward from articulating mount 175 and is connected to lower vertical fin member 155 through the articulating mount. Upper vertical member 192, lower vertical fin member 155, and articulating mount 175 comprise a fin assembly 194.

Upper vertical member 192 includes an upper trailing rudder 195 (see FIG. 2). Upper trailing rudder 195 is movably attached to a trailing edge 196 of upper vertical member 192 and configured to generate a yaw control moment acting on aircraft 120.

The connection between upper trailing rudder 195 and trailing edge 196 may be substantially similar, in some respects, to the connection between lower rudder 160 and trailing edge 158, described above. Like lower rudder 160, upper trailing rudder 195 may comprise a single-hinged rudder, a double-hinged rudder, a triple-hinged rudder, a tabbed rudder, a slotted rudder, a blown rudder, a rudder comprising multiple adjacent panels, a rudder comprising full or partial double-hinged rudder members, and/or any other suitable rudder or rudders. Typically, upper trailing rudder 195 is positioned directly above lower rudder 160, e.g., at a same position along horizontal axis 187.

In some examples, upper vertical member 192 and lower vertical fin member 155 are sized and shaped such that a leading edge (e.g., a forward edge) of the upper vertical member is substantially aligned with a leading edge of the lower vertical fin member when upper stabilizer assembly 170 is positioned at zero incidence relative to a longitudinal axis of fuselage 141, and/or when the upper stabilizer assembly is at another predetermined position. Additionally, or alternatively, trailing edges 158 and 196 may be substantially aligned when upper stabilizer assembly 170 is at zero incidence, and/or at another predetermined position. Alignment of the respective leading edges and/or respective trailing edges of upper vertical member 192 and lower vertical member 155 may reduce drag relative to other configurations, and/or may provide other aerodynamic advantages.

Figure 4:
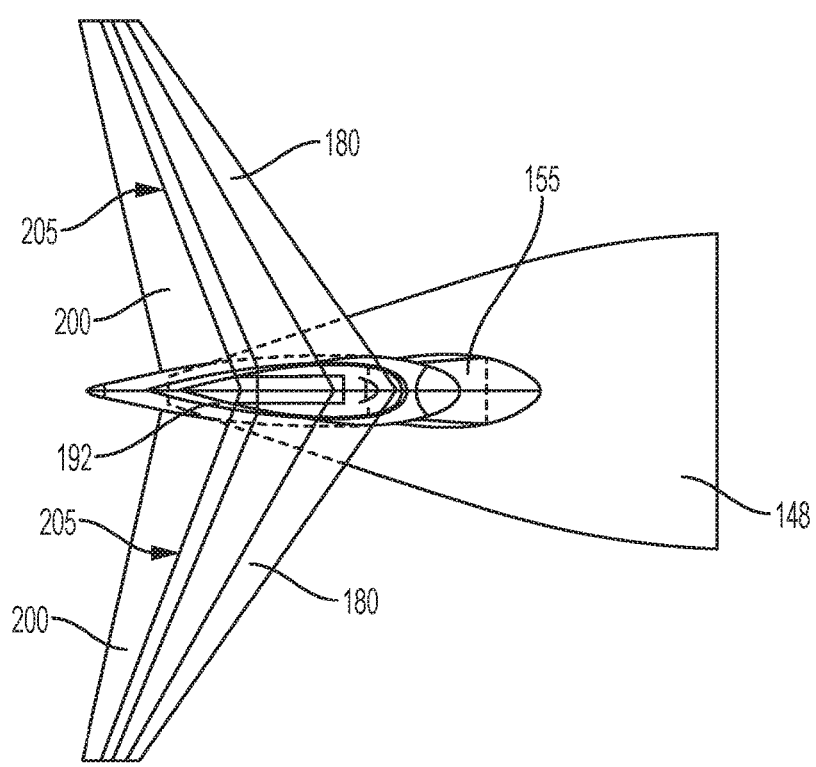
FIG. 4 is a top view of the cruciform empennage of FIG. 3.

As shown in FIG. 4, which is a top view, each horizontal stabilizer portion 180 has an elevator 200. Elevator 200 is disposed at a trailing edge 205 (e.g., an aft edge) of the corresponding horizontal stabilizer portion 180. Typically, elevator 200 is connected hingedly to trailing edge 205, and one or more actuators are configured to adjust an angular position of the elevator relative to the corresponding horizontal stabilizer portion 180. Each elevator 200 is typically configured to be adjusted independently of the other elevator, but in some cases the adjustment of one elevator is configured to depend on a position and/or movement of the other elevator. Elevator 200 may comprise multiple adjacent panels (e.g., an inboard elevator and an outboard elevator), full or partial double-hinged elevator members, and/or any other suitable elevator or elevators.

The angular position of each elevator 200 determines a pitch moment generated on aircraft 120 by the elevator. The pair of elevators 200 may be adjusted to achieve a desired net pitch moment cooperatively generated by the elevators (e.g., a vector sum of the moments generated by the two elevators). Elevators 200 may be operated symmetrically (e.g., both deflected upwards or both deflected downwards, by a same amount or by different amounts) or asymmetrically (e.g., one deflected upwards and one deflected downwards, by a same amount or by different amounts), in order to generate a desired pitch moment. A pitch moment generated by elevators 200 is typically a pitch control moment, but in some examples, elevators 200 may additionally or alternatively generate a pitch trim moment.

Figures 5, 6:
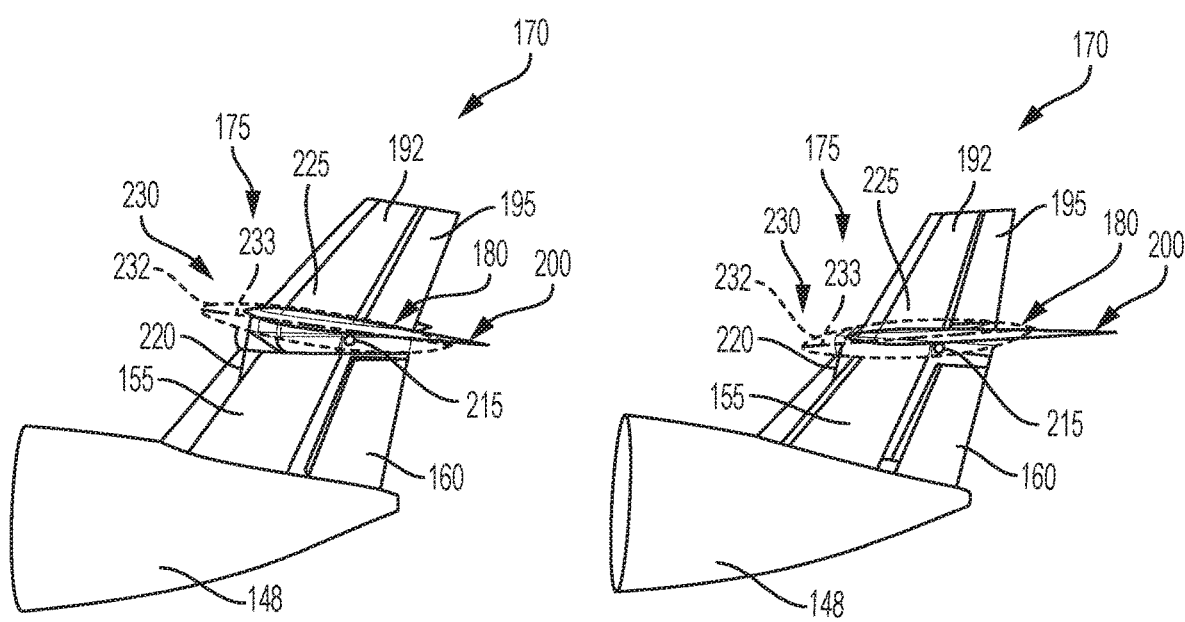
FIG. 5 is a side view of the cruciform empennage oriented at a positive incidence.
FIG. 6 is a side view of the cruciform empennage oriented at a negative incidence.

As described above, upper stabilizer assembly 170 is connected to lower vertical fin member 155 through an articulating mount 175. Articulating mount 175, depicted in FIGS. 5-6, is configured to generate a pitch moment by adjusting a position of upper stabilizer assembly 170 relative to lower vertical fin member 155. Articulating mount 175 is typically configured to allow rotation of upper stabilizer assembly 170 about a rotation axis 215 substantially perpendicular to plane of symmetry 190. Rotation axis 215 is depicted extending into the page in FIGS. 5-6. Rotation axis 215 may be located along a pin, bolt, rail, and/or any other suitable device configured to allow rotation of upper stabilizer assembly 170 about rotation axis 215. Rotating upper stabilizer assembly 170 about rotation axis 215 may change a pitch of the upper stabilizer assembly relative to lower vertical fin member 155. Additionally, or alternatively, this rotation may change an angle of incidence of upper stabilizer assembly 170 (e.g., an angle between a longitudinal axis of the upper stabilizer assembly and a longitudinal axis of fuselage 141). FIG. 5 depicts upper stabilizer assembly 170 rotated to a positive angle of incidence, and FIG. 6 depicts upper stabilizer assembly 170 rotated to a negative angle of incidence. In FIGS. 2-4, upper stabilizer assembly 170 is depicted at zero incidence.

Articulating mount 175 includes an articulation device 220. Articulation device 220 may comprise any suitable mechanism configured to rotate upper stabilizer assembly 170 about rotation axis 215. In the example depicted in FIGS. 5-6, articulation device 220 comprises a jackscrew actuator attached to lower vertical fin member 155 and configured to push a lower portion 225 of upper stabilizer assembly 170, such that the upper stabilizer assembly rotates about rotation axis 215. Alternatively, or additionally, articulation device 220 may comprise a hydraulic actuator, an electrohydraulic actuator, an electromechanical actuator, and/or any other suitable actuator.

In some examples, articulation device 220 is configured to rotate each horizontal stabilizer portion 180 independently of the other horizontal stabilizer portion.

Figure 7:
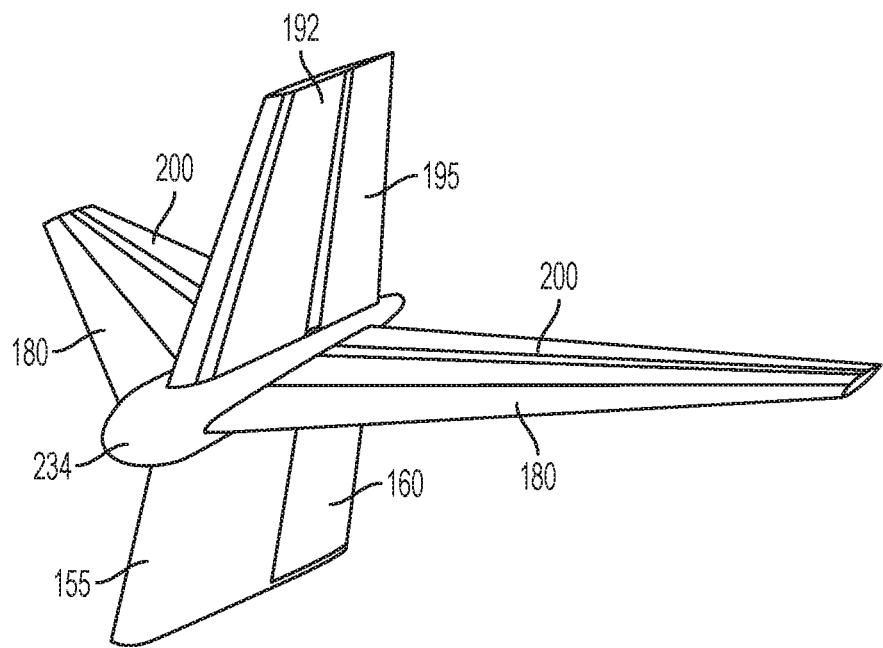
FIG. 7 is an isometric view of the cruciform empennage depicting an illustrative wiping surface device, in accordance with aspects of the present disclosure.

As shown in FIGS. 5-7, cruciform empennage 150 may include a fairing device 230 configured to reduce aerodynamic drag. Fairing device 230 is typically disposed at, and/or adjacent to, articulating mount 175. The size, shape, material composition, and/or any other suitable characteristics of fairing device 230 are designed to reduce drag associated with the combination of upper stabilizer assembly 170 and lower vertical fin member 155 connected by articulating mount 175. For example, fairing device 230 may be configured to reduce interference drag between upper stabilizer assembly 170 and lower vertical fin member 155.

In the example shown in FIGS. 5-6, fairing device comprises a bullet fairing 232 attached to lower portion 225 of upper stabilizer assembly 170. Lower portion 225 may include portions of upper vertical member 192 and/or horizontal stabilizer portions 180 adjacent articulating mount 175. Bullet fairing 232 comprises an elongate surface or shell extending along lower portion 225 of upper stabilizer assembly 170. Bullet fairing 232 has a longitudinal axis 233. Surfaces of bullet fairing 232 may at least partially contain lower portion 225 of upper stabilizer assembly 170, distal portion 172 of lower vertical fin member 155, articulating mount 175, articulation device 220, and/or any other suitable adjacent empennage components, so that the fairing reduces drag associated with these components. In the example shown in FIGS. 5-6, bullet fairing 232 moves with upper stabilizer assembly 170 as the upper stabilizer assembly is rotated about rotation axis 215, and may therefore be referred to as an all-moving fairing.

Alternatively, or additionally, fairing device 230 may comprise a fixed or static fairing. An illustrative static fairing 234 is depicted in FIG. 7. Static fairing 234 is attached to distal portion 172 of lower vertical fin member 155. Lower portion 225 of upper stabilizer assembly 170 and articulation device 220 are typically contained within static fairing 234. Static fairing 234 comprises a wiping surface device configured to allow upper stabilizer assembly 170 to rotate relative to lower vertical fin member 155 while static fairing 234 remains fixed to the lower vertical member. In the example depicted in FIG. 7, horizontal stabilizer portions 180 protrude through openings in static fairing 234, and the openings are large enough to accommodate movement of the horizontal stabilizer portions during movement of upper stabilizer assembly 170. The wiping surface device includes wiping surfaces that are attached to horizontal stabilizer portions 180 and configured to cover the openings. The wiping surfaces slide relative to static fairing 234, allowing upper stabilizer assembly 170 to move relative to lower vertical fin member 155 within the static fairing. The use of wiping surfaces may enable low-drag integration of the trimmable upper stabilizer assembly relative to the supporting vertical fin. Wiping surfaces have been used, for example, in T-tail empennages of Boeing 717 and 727 aircraft.

C. Illustrative Empennage With H-Shaped Tail

Figure 8:
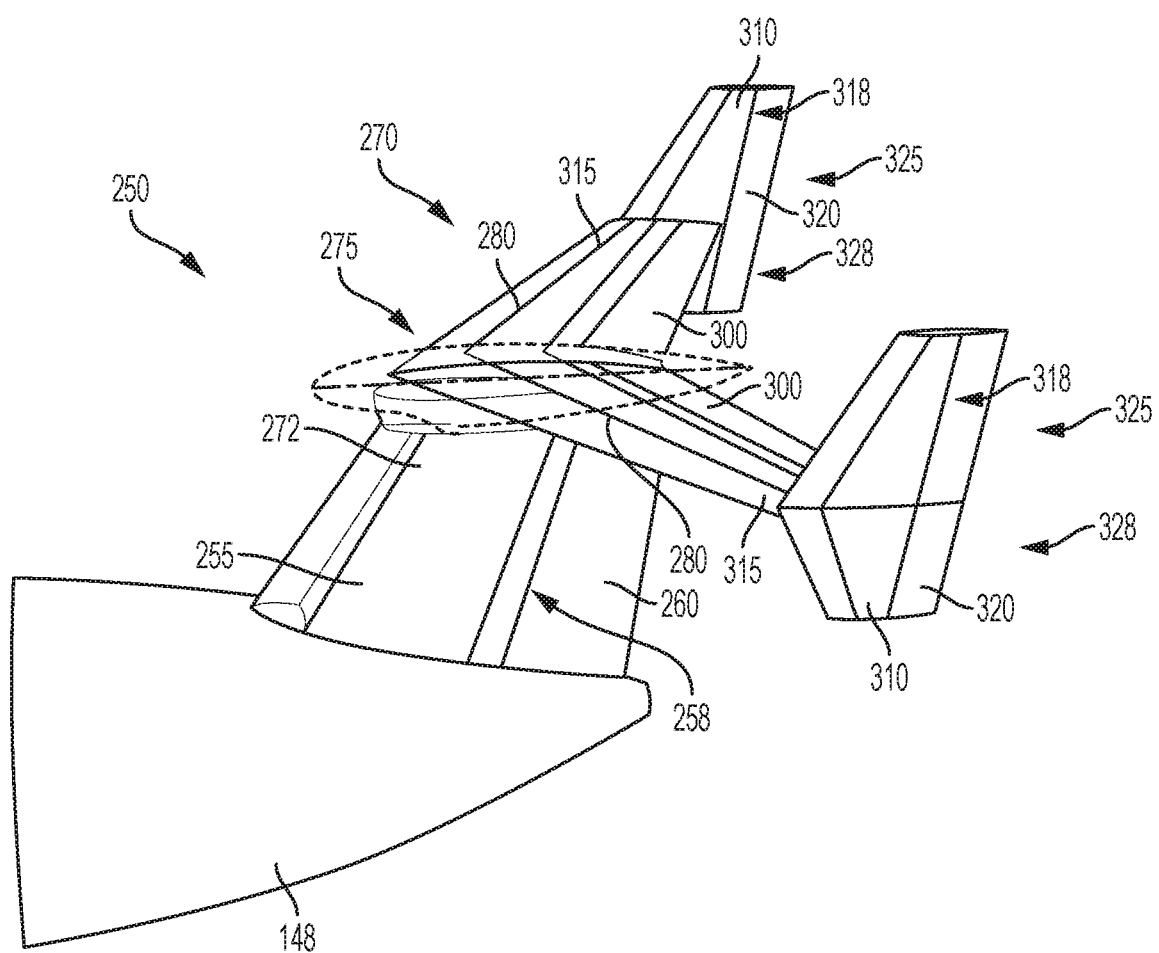
FIG. 8 is an isometric view of an illustrative H-tail empennage having distal upper vertical members, in accordance with aspects of the present disclosure.

This section describes an illustrative H-tail empennage 250 having distal upper vertical portions, as shown in FIG. 8. H-tail empennage 250 is another example of an empennage having an articulated upper stabilizer assembly, as described above. In some respects, H-tail empennage 250 is substantially similar to cruciform empennage 150. Accordingly, H-tail empennage 250 includes a lower vertical member 255 attached to rear portion 148 of an aircraft fuselage. Lower vertical member 255 has a trailing edge 258, and a lower rudder 260 is movably attached to trailing edge 258 and configured to generate a yaw moment acting on the aircraft. An upper stabilizer assembly 270 is adjustably mounted to a distal portion 272 of lower vertical member 255 via an articulating mount 275. Articulating mount 275 may include any suitable articulating devices and/or may be contained within any suitable fairing device(s), as described above with reference to cruciform empennage 150.

Upper stabilizer assembly 270 includes a pair of horizontal stabilizer portions 280 extending from articulating mount 275 in substantially opposing directions. In some respects, horizontal stabilizer portions 280 may be substantially similar to horizontal stabilizer portions 180.

An elevator 300 is disposed at a trailing edge of each horizontal stabilizer portion 280. Elevators 300 of H-tail empennage 250 may be adjusted to generate pitch moments, as described above with reference to elevators 200 of cruciform empennage 150.

H-tail empennage 250 includes a pair of upper vertical members 310. Each upper vertical member 310 is connected to a respective distal end 315 of a respective one of horizontal stabilizer portions 280. Each upper vertical member 310 has a respective trailing end 318 (e.g., a trailing edge). A respective upper trailing rudder 320 is attached to each trailing end 318. Each upper trailing rudder 320 is configured to generate a yaw control moment acting on the aircraft.

As shown in FIG. 8, each upper vertical member 310 and each upper trailing rudder 320 extends both upward and downward from the corresponding horizontal stabilizer portion 280. In other words, distal end 315 of horizontal stabilizer portion 280 connects to a medial portion of upper vertical member 310, such that each upper vertical member has a respective upward portion 325 extending above the corresponding horizontal stabilizer portion 280, and a respective downward portion 328 extending below the corresponding horizontal stabilizer portion. Upward portion 325 and downward portion 328 may each have any respective shape and respective size suitable for generating a yaw control moment via upper trailing rudder 320. Additionally, respective shapes and respective sizes of upward portion 325 and downward portion 328 are typically designed such that the upward and downward portions are low in weight and produce as little aerodynamic drag as possible.

In some examples, downward portions 328 are omitted from upper vertical members 310. In these examples, the empennage may be referred to as a U-tail empennage. Alternatively, or additionally, upward portions 325 may be omitted from upper vertical members 310. Alternatively, or additionally, upper stabilizer assembly 270 may include a central vertical member positioned directly above lower vertical member 255. This central vertical member may, in some respects, be substantially similar to upper vertical member 192 of cruciform empennage 150.

D. Illustrative Empennage Control System

Figure 9:
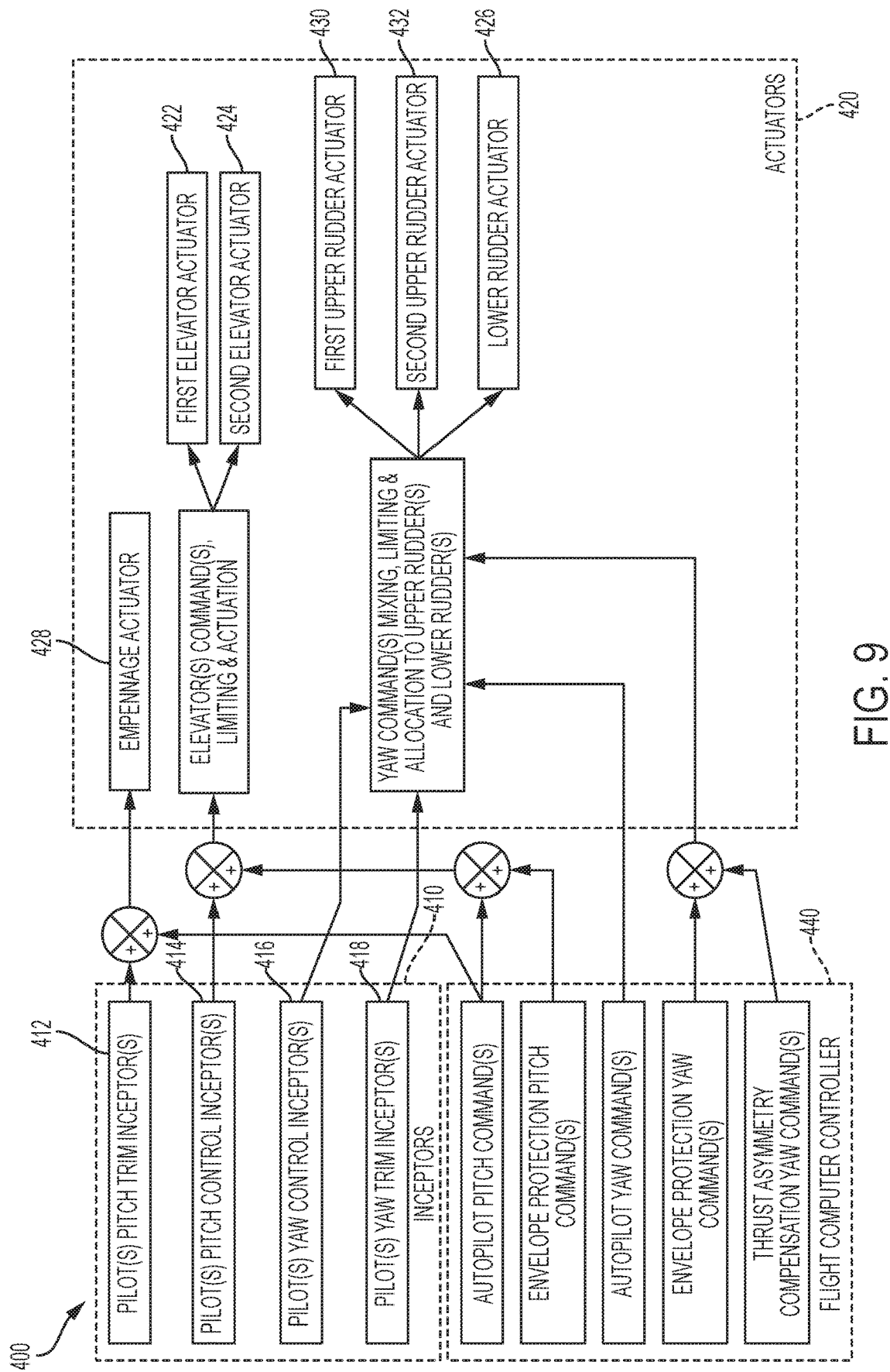
FIG. 9 is a schematic diagram depicting an illustrative empennage control system in accordance with aspects of the present disclosure.

This section describes an illustrative empennage control system 400, as shown in FIG. 9. Empennage control system 400, which may be part of aircraft control system 132, may be used to control an aircraft empennage in accordance with aspects of the present teachings.

Empennage control system 400 includes one or more inceptors 410 configured to send control signals that operate empennage control devices to generate a desired pitch and/or yaw moment. Inceptor 410 may comprise any input device usable (e.g., by an aircraft pilot) to operate empennage control devices. Illustrative inceptors 410 may include sticks, levers, throttles, yokes, control wheel and column modules, pedals, steering tiller devices, trim switches, buttons, electronic user interfaces, voice-command devices, and/or the like. Typically, inceptors 410 are categorized by the respective moment they are configured to contribute. For example, inceptors 410 may include a pitch trim inceptor 412, a pitch control inceptor 414, a yaw control inceptor 416, a yaw trim inceptor 418, and/or any other suitable inceptor.

Empennage control system 400 couples inceptors 410 to device actuators 420 configured to operate empennage control devices. For example, respective device actuators 420 may adjust positions of elevators and rudders, and may rotate an upper empennage assembly relative to a lower vertical member. Device actuator 420 may comprise any suitable actuator, such as a jackscrew actuator, an electrohydraulic actuator, an electromechanical actuator, and/or the like. Typically, device actuators 420 include a first elevator actuator 422 configured to operate a first elevator, a second elevator actuator 424 configured to operate a second elevator, a lower rudder actuator 426 configured to operate a lower rudder, an empennage actuator 428 configured to rotate an upper stabilizer assembly to a commanded orientation, a first upper rudder actuator 430 configured to operate a first upper rudder, and, if needed, a second upper rudder actuator 432 configured to operate an optional second upper rudder. Articulation device 220, described above, is an example of empennage actuator 428.

Empennage control system 400 may couple inceptors 410 to device actuators 420 by any suitable mechanism configured to cause the device actuators to operate respective devices according to input provided via the inceptors. For example, inceptors 410 may be coupled mechanically to device actuators 420 via tension cables, pushrods, pulleys, counterweights, and/or any other suitable mechanical parts. Additionally, or alternatively, inceptors 410 may be coupled to device actuators 420 via a hydraulic system, an electric and/or electronic system (e.g., fly-by-wire systems), an optical system (e.g., a fly-by-light system), and/or any other suitable system.

Empennage control system 400 may additionally couple a flight computer controller 440 to device actuators 420. Flight computer controller 440 is configured to automatically compute commands for device actuators 420. That is, flight computer controller 440 may generate commands without direct input from a pilot via inceptors 410. For example, flight computer controller 440 may be configured to execute an autopilot program that automatically sends to device actuators 420 one or more commands configured to cause the aircraft to take off, cruise, and/or land. The commands may include, e.g., yaw commands and/or pitch commands configured to effect actuator movement to generate respective yaw and/or pitch moments.

In some examples, flight computer controller 440 is further configured to generate commands configured to modify, counter-act, and/or compensate for commands input via inceptors 410 and/or generated by an autopilot program. For example, flight computer controller 440 may include an envelope protection program configured to generate pitch and/or yaw commands to prevent the aircraft from operating outside of safe performance limits, a thrust asymmetry compensation program configured to generate pitch and/or yaw commands to compensate for a disparity in thrust provided by aircraft propulsors, and/or any other suitable programs.

Flight computer controller 440 may generate pitch and/or yaw commands in accordance with one or more flight control modes and/or laws. For example, flight computer controller 440 may generate commands according to a first flight control law under normal operating conditions, and may switch to a second flight control law if conditions become abnormal (e.g., if one or more predetermined aircraft instruments or devices malfunction).

FIG. 9 schematically depicts an illustrative flow of commands and control signals from inceptors 410 and flight computer controller 440 to device actuators 420. For example, a pitch trim signal produced by pitch trim inceptor 412 is mixed with an autopilot pitch command from flight computer controller 440 to produce a signal to operate empennage actuator 428.

As another example, an autopilot pitch command is mixed with an envelope protection pitch command to obtain a computed pitch command, and the computed pitch command is mixed with a pitch control signal from pitch control inceptor 414 to produce elevator command signals to operate the elevators. First and second elevator actuator signals for operating first and second elevator actuators 422 and 424 are obtained based on the elevator command signals. The first and second elevator actuator signals may be obtained from the elevator command signals according to one or more elevator control laws. The control laws may, for example, ensure that the first and second elevator actuator signals operate the elevators within safe aircraft performance limits.

As yet another example, a computed yaw command may be obtained based on the autopilot yaw command, the envelope protection yaw command, and the thrust asymmetry compensation yaw command. The computed yaw command may be mixed with a yaw control signal from yaw control inceptor 416 and a yaw trim signal from yaw trim inceptor 418 to produce a rudder command signal. A lower rudder actuator signal for operating lower rudder actuator 426 and a first upper rudder actuator signal for operating first upper rudder actuator 430 are obtained based on the rudder command signal. If a second upper rudder is present, then a second upper rudder actuator signal for operating second upper rudder actuator 432 is also obtained based on the rudder command signal. The lower rudder actuator signal and the one or more upper rudder actuator signals may be obtained from the rudder command signal according to one or more rudder control laws.

E. Illustrative Method of Controlling an Aircraft

Figure 10:
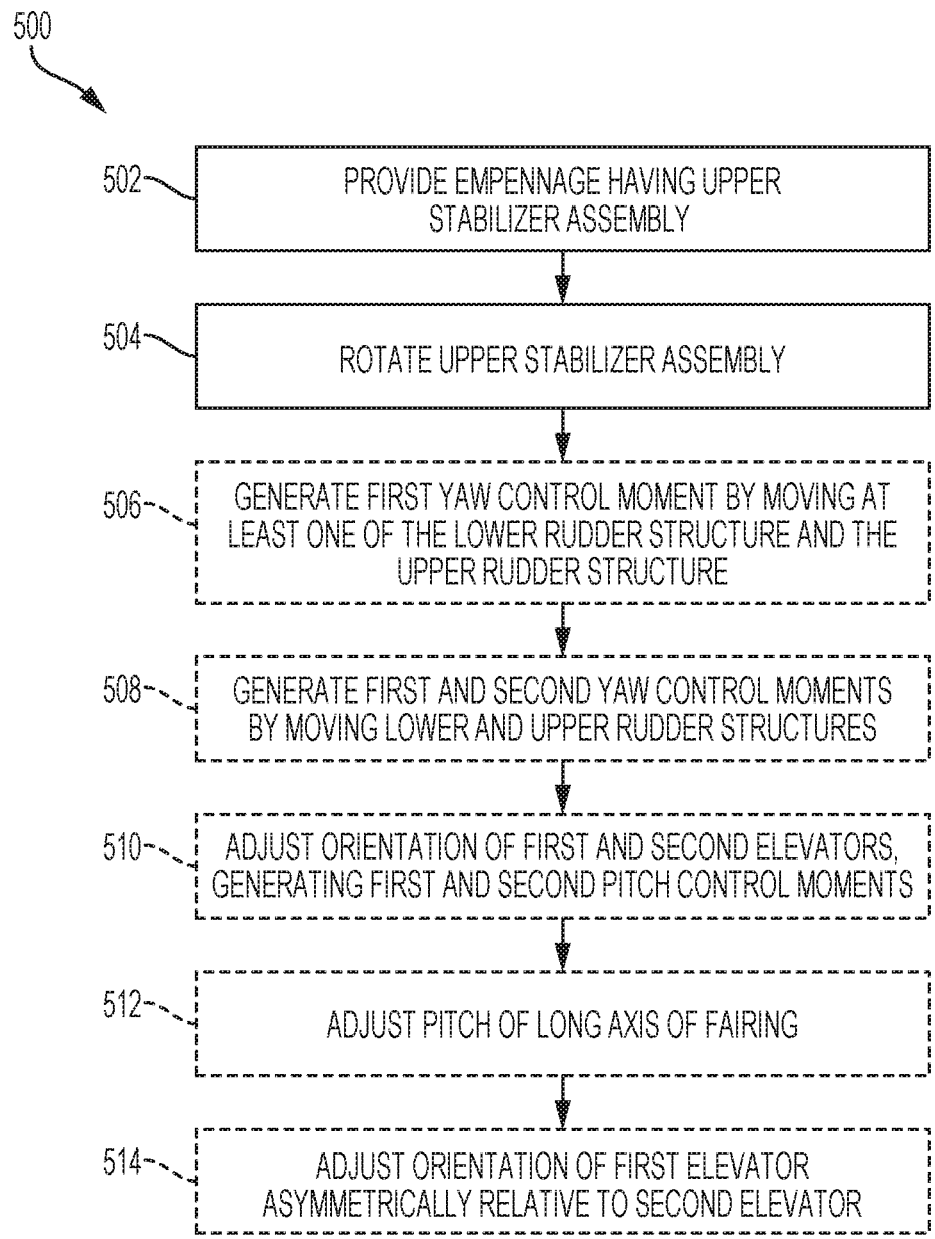
FIG. 10 is a flow diagram depicting steps of an illustrative method of trimming pitch of an aircraft, in accordance with aspects of the present disclosure.

This section describes steps of an illustrative method 500 for controlling an aircraft; see FIG. 10. Aspects of cruciform empennages, H-tail empennages, and/or U-tail empennages may be utilized in the method steps described below. Where appropriate, reference may be made to components and systems that may be used in carrying out each step. These references are for illustration, and are not intended to limit the possible ways of carrying out any particular step of the method.

FIG. 10 is a flowchart illustrating steps performed in an illustrative method, and may not recite the complete process or all steps of the method. Although various steps of method 500 are described below and depicted in FIG. 10, the steps need not necessarily all be performed, and in some cases may be performed simultaneously or in a different order than the order shown.

At step 502, method 500 includes providing an empennage having an upper stabilizer assembly. The provided empennage, which is connected to a rear portion of an aircraft fuselage, further includes a lower vertical fin member. The upper stabilizer assembly is connected to the lower vertical fin member by an articulating mount configured to allow movement of the entire upper stabilizer assembly relative to the lower vertical fin member. When the aircraft is in a flight mode, moving the upper stabilizer assembly relative to the lower vertical fin member may generate a pitch trim moment acting on the aircraft. The lower vertical fin member has a lower trailing rudder structure configured for generating a yaw control moment acting on the aircraft. The upper stabilizer assembly includes at least a first horizontal portion (e.g., a horizontal stabilizer portion) and a first vertical portion. The first horizontal portion has a first trailing elevator configured for generating a pitch control moment acting on the aircraft, and the first vertical portion has an upper trailing rudder structure configured for generating a yaw control moment acting on the aircraft. The upper stabilizer assembly may further include a second horizontal portion having a second trailing elevator, and/or a second vertical portion having a second upper trailing rudder structure. Cruciform empennage 150 and H-tail empennage 250 are examples of the empennage provided at step 502.

At step 504, method 500 includes rotating the upper stabilizer assembly around an axis perpendicular to a plane of symmetry of the aircraft. As described above with reference to step 502, rotating the upper stabilizer assembly in this manner may generate a pitch trim moment acting on the aircraft.

At step 506, method 500 optionally includes generating a first yaw control moment acting on the aircraft by moving at least one of the lower trailing rudder structure and the upper trailing rudder structure.

At step 508, method 500 optionally includes generating the first yaw control moment and a second yaw control moment acting on the aircraft by moving both the lower trailing rudder structure and the upper trailing rudder structure.

At step 510, method 500 optionally includes adjusting an orientation of the first trailing elevator and an orientation of a second trailing elevator of the upper stabilizer assembly. The second trailing elevator may be attached to a trailing edge of a second horizontal portion, as described above with reference to step 502. Adjusting the orientations of the first and second trailing elevators generates first and second pitch control moments acting on the aircraft.

At step 512, method 500 optionally includes adjusting the pitch of a longitudinal axis of a fairing containing the articulating mount. The pitch of the fairing axis is adjusted relative to a longitudinal axis of the aircraft fuselage. For example, the fairing may be adjusted to a negative incidence angle, a positive incidence angle, or a zero incidence angle.

At step 514, method 500 optionally includes adjusting an orientation of the first trailing elevator asymmetrically relative to a second trailing elevator (e.g., the second trailing elevator described above with reference to step 510). Asymmetric elevator operation may be beneficial and/or necessary to achieve a desired pitch control moment.

F. Illustrative Combinations and Additional Examples

This section describes additional aspects and features of empennages having movable upper stabilizer assemblies, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A. An aircraft, comprising a fuselage capable of carrying payload, the fuselage having a rear portion; and an empennage connected to the rear portion of the fuselage, the empennage including a lower vertical fin member, and an upper stabilizer assembly connected to the lower vertical fin member by an articulating mount configured to allow movement of the upper stabilizer assembly relative to the lower vertical fin member to generate a pitch trim moment acting on the aircraft in a flight mode, wherein the lower vertical fin member has a lower trailing rudder structure, the upper stabilizer assembly having first and second horizontal stabilizer portions and at least a first upper vertical member, the first upper vertical member having a first upper trailing rudder structure, each of the rudder structures being configured to generate a yaw control moment acting on the aircraft.

A1. The aircraft of paragraph A, wherein the lower trailing rudder structure is below the articulating mount, and the first upper trailing rudder structure is above the articulating mount.

A2. The aircraft of any one of paragraphs A through A1, wherein the first upper trailing rudder structure is directly above the lower trailing rudder structure.

A3. The aircraft of any one of paragraphs A through A1, wherein the first upper vertical member is connected to a distal end of the first horizontal stabilizer portion, a second upper vertical member being connected to a distal end of the second horizontal stabilizer portion, the first upper trailing rudder structure being connected to a trailing end of the first upper vertical member, and a second upper trailing rudder structure being connected to a trailing end of the second upper vertical member, each of the upper and lower trailing rudder structures being configured to generate a yaw control moment acting on the aircraft.

A4. The aircraft of paragraph A3, wherein each horizontal stabilizer portion has an adjustable trailing-edge elevator configured to generate a pitch control moment acting on the aircraft.

A5. The aircraft of any one of paragraphs A through A4, wherein the articulating mount allows rotation of the upper stabilizer assembly around an axis perpendicular to a plane of symmetry of the fuselage.

A6. The aircraft of paragraph A5, further comprising an articulation device including at least one of (i) a jackscrew actuator, (ii) a hydraulic actuator, (iii) an electrohydraulic actuator and an (iv) electromechanical actuator, configured to move the upper stabilizer assembly relative to the lower vertical fin member.

A7. The aircraft of any one of paragraphs A5 through A6, wherein the articulating mount permits adjustment of the upper stabilizer assembly between a negative incidence angle and a positive incidence angle relative to a longitudinal axis of the fuselage.

A8. The aircraft of any one of paragraphs A through A7, wherein the articulating mount is contained within a fairing configured to reduce drag.

B. An aircraft, comprising a fuselage capable of carrying payload, the fuselage having a rear portion, a fin assembly including a lower fin portion connected to a first upper fin portion through an articulating mount, and a first horizontal stabilizer portion connected to a second horizontal stabilizer portion through the articulating mount, wherein the articulating mount permits trim control movement of the first upper fin portion together with the first and second horizontal stabilizer portions relative to the lower fin portion.

B1. The aircraft of paragraph B, wherein the first upper fin portion is located directly above the lower fin portion.

B2. The aircraft of paragraph B, wherein the first upper fin portion is connected to a distal end portion of the first horizontal stabilizer portion, a second upper fin portion being connected to a distal end portion of the second horizontal stabilizer portion.

B3. The aircraft of any one of paragraphs B through B2, wherein each of the fin portions has a trailing-edge control surface configured to generate a yaw control moment acting on the aircraft.

B4. The aircraft of any one of paragraphs B through B3, wherein the articulating mount is contained within a fairing configured to reduce drag.

B5. The aircraft of paragraph B, wherein the lower fin portion has a first rudder structure positioned below the articulating mount, and the first upper fin portion has a second rudder structure positioned above the articulating mount.

C. A method of trimming pitch of an aircraft, comprising providing an empennage connected to a rear portion of a fuselage, the empennage including a lower vertical fin member, and an upper stabilizer assembly connected to the lower vertical fin member by an articulating mount configured to allow movement of the upper stabilizer assembly relative to the lower vertical fin member to generate a pitch trim moment acting on the aircraft in a flight mode, the lower vertical fin member having a lower trailing rudder structure configured for generating a yaw control moment acting on the aircraft, the upper stabilizer assembly including at least a first horizontal portion and a first vertical portion, the first horizontal portion having a first trailing elevator configured for generating a pitch control moment acting on the aircraft, and the first vertical portion having an upper trailing rudder structure configured for generating a yaw control moment acting on the aircraft, and rotating the upper stabilizer assembly around an axis perpendicular to a plane of symmetry of the aircraft.

C1. The method of paragraph C, further comprising generating a first yaw control moment acting on the aircraft by moving at least one of: (i) the lower trailing rudder structure, and (ii) the upper trailing rudder structure.

C2. The method of paragraph C1, further comprising generating the first yaw control moment and a second yaw control moment acting on the aircraft by moving both the lower trailing rudder structure and the upper trailing rudder structure.

C3. The method of paragraphs C through C2, further comprising adjusting an orientation of the first trailing elevator and a second trailing elevator of the upper stabilizer assembly, generating first and second pitch control moments acting on the aircraft.

C4. The method of any one of paragraphs C through C3, further comprising adjusting pitch of a longitudinal axis of a fairing containing the articulating mount relative to a longitudinal axis of the fuselage.

C5. The method of any one of paragraphs C through C2, further comprising adjusting an orientation of the first trailing elevator asymmetrically relative to a second trailing elevator of the upper stabilizer assembly.

Advantages, Features, and Benefits

The different embodiments and examples of the empennages described herein provide several advantages over known empennage systems. For example, illustrative embodiments and examples described herein allow an empennage having a low weight.

Additionally, and among other benefits, illustrative embodiments and examples described herein allow an empennage having reduced wetted area and a low amount of aerodynamic drag.

Additionally, and among other benefits, illustrative embodiments and examples described herein allow an empennage having control surfaces located above the aircraft wings (e.g., spaced from the wings by a vertical distance), so that the control surfaces avoid buffet from the wings.

Additionally, and among other benefits, illustrative embodiments and examples described herein allow an empennage that occupies less space in the fuselage than conventional empennages. Conventional empennages typically have horizontal stabilizers mounted directly the fuselage, and therefore a portion of the fuselage interior is occupied by mounts and other structure associated with the horizontal stabilizers. An empennage in accordance with aspects of the present teachings includes an upper stabilizer assembly adjustably mounted on a vertical fin. Accordingly, less fuselage space is required to accommodate structures associated with the empennage described herein.

Additionally, and among other benefits, illustrative embodiments and examples described herein allow for trimming aircraft pitch by adjusting a position of an upper stabilizer assembly relative to a vertical fin.

No known system or device includes the benefits described here and elsewhere in the specification. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. An aircraft, comprising:
a fuselage capable of carrying payload, the fuselage having a rear portion; and
an empennage connected to the rear portion of the fuselage, the empennage including a lower vertical fin member, and an upper stabilizer assembly connected to the lower vertical fin member by an articulating mount that allows rotation of the entire upper stabilizer assembly relative to the lower vertical fin member around an axis perpendicular to a plane of symmetry of the fuselage to generate a pitch trim moment acting on the aircraft in a flight mode, wherein the lower vertical fin member has a lower trailing rudder structure, the upper stabilizer assembly having first and second horizontal stabilizer portions and at least a first upper vertical member, the first upper vertical member having a first upper trailing rudder structure, each of the rudder structures being configured to generate a yaw control moment acting on the aircraft,
wherein the lower trailing rudder structure is below the articulating mount, and the first upper trailing rudder structure is above the articulating mount.

2. The aircraft of claim 1, wherein the first upper trailing rudder structure is directly above the lower trailing rudder structure.

3. The aircraft of claim 1, wherein the first upper vertical member is connected to a distal end of the first horizontal stabilizer portion, a second upper vertical member being connected to a distal end of the second horizontal stabilizer portion, the first upper trailing rudder structure being connected to a trailing end of the first upper vertical member, and a second upper trailing rudder structure being connected to a trailing end of the second upper vertical member, each of the upper and lower trailing rudder structures being configured to generate a yaw control moment acting on the aircraft.

4. The aircraft of claim 3, wherein each horizontal stabilizer portion has an adjustable trailing-edge elevator configured to generate a pitch control moment acting on the aircraft.

5. The aircraft of claim 1, further comprising:
an articulation device including at least one of (i) a jackscrew actuator, (ii) a hydraulic actuator, (iii) an electrohydraulic actuator and an (iv) electromechanical actuator, configured to move the upper stabilizer assembly relative to the lower vertical fin member.

6. The aircraft of claim 1, wherein the articulating mount permits adjustment of the upper stabilizer assembly between a negative incidence angle and a positive incidence angle relative to a longitudinal axis of the fuselage.

7. The aircraft of claim 1, wherein the articulating mount is contained within a fairing configured to reduce drag.

8. An aircraft, comprising:
a fuselage capable of carrying payload, the fuselage having a rear portion,
a fin assembly including a lower fin portion connected to a first upper fin portion through an articulating mount, and
a first horizontal stabilizer portion connected to a second horizontal stabilizer portion through the articulating mount, wherein the articulating mount permits trim control rotation of the first upper fin portion together with the first and second horizontal stabilizer portions, relative to the lower fin portion, around an axis perpendicular to a plane of symmetry of the fuselage,
wherein the lower fin portion has a first rudder structure positioned below the articulating mount, and the first upper fin portion has a second rudder structure positioned above the articulating mount.

9. The aircraft of claim 8, wherein the first upper fin portion is located directly above the lower fin portion.

10. The aircraft of claim 8, wherein the first upper fin portion is connected to a distal end portion of the first horizontal stabilizer portion, a second upper fin portion being connected to a distal end portion of the second horizontal stabilizer portion.

11. The aircraft of claim 8, wherein each of the fin portions has a trailing-edge control surface configured to generate a yaw control moment acting on the aircraft.

12. The aircraft of claim 8, wherein the articulating mount is contained within a fairing configured to reduce drag.

13. The aircraft of claim 8, wherein each horizontal stabilizer portion has an adjustable trailing-edge elevator configured to generate a pitch control moment acting on the aircraft.

14. The aircraft of claim 8, further comprising:
an articulation device including at least one of (i) a jackscrew actuator, (ii) a hydraulic actuator, (iii) an electrohydraulic actuator and an (iv) electromechanical actuator, configured to move the first upper fin portion together with the first and second horizontal stabilizer portions, relative to the lower fin portion.

15. The aircraft of claim 8, wherein the articulating mount permits adjustment of the first upper fin portion together with the first and second horizontal stabilizer portions, between a negative incidence angle and a positive incidence angle relative to a longitudinal axis of the fuselage.

16. A method of trimming pitch of an aircraft, comprising:
providing an empennage connected to a rear portion of a fuselage, the empennage including a lower vertical fin member, and an upper stabilizer assembly connected to the lower vertical fin member by an articulating mount configured to allow movement of the upper stabilizer assembly relative to the lower vertical fin member to generate a pitch trim moment acting on the aircraft in a flight mode, the lower vertical fin member having a lower trailing rudder structure configured for generating a yaw control moment acting on the aircraft, the upper stabilizer assembly including at least a first horizontal portion and a first vertical portion, the first horizontal portion having a first trailing elevator configured for generating a pitch control moment acting on the aircraft, and the first vertical portion having an upper trailing rudder structure configured for generating a yaw control moment acting on the aircraft, and
rotating the entire upper stabilizer assembly around an axis perpendicular to a plane of symmetry of the aircraft,
wherein the lower trailing rudder structure is below the articulating mount, and the upper trailing rudder structure is above the articulating mount.

17. The method of claim 16, further comprising:
generating a first yaw control moment acting on the aircraft by moving at least one of: (i) the lower trailing rudder structure, and (ii) the upper trailing rudder structure.

18. The method of claim 17, further comprising:
generating the first yaw control moment and a second yaw control moment acting on the aircraft by moving both the lower trailing rudder structure and the upper trailing rudder structure.

19. The method of claim 16, further comprising:
adjusting an orientation of the first trailing elevator and a second trailing elevator of the upper stabilizer assembly, generating first and second pitch control moments acting on the aircraft.

20. The method of claim 16, further comprising:
adjusting pitch of a longitudinal axis of a fairing containing the articulating mount relative to a longitudinal axis of the fuselage.

21. The method of claim 16, further comprising:
adjusting an orientation of the first trailing elevator asymmetrically relative to a second trailing elevator of the upper stabilizer assembly.

* * * * *